June 26, 1973     J. WALKER     3,741,796
SILICA DEPOSITION UTILIZING MULTIPLE TORCHES
Original Filed July 11, 1966     3 Sheets-Sheet 1

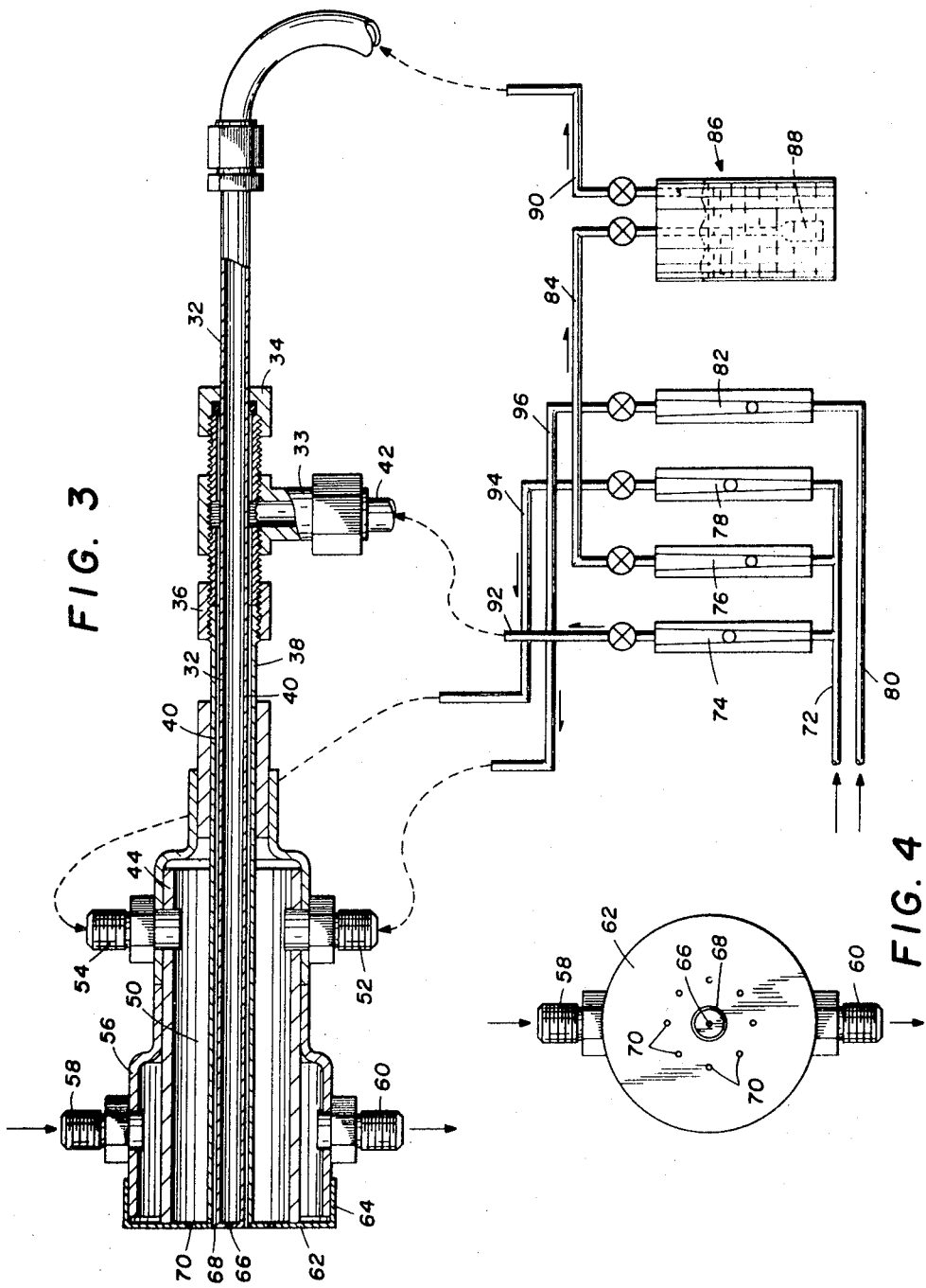

United States Patent Office 3,741,796
Patented June 26, 1973

3,741,796
SILICA DEPOSITION UTILIZING
MULTIPLE TORCHES
Jack Walker, Richardson, Tex., assignor to Texas
Instruments Incorporated, Dallas, Tex.
Original application July 11, 1968, Ser. 744,152, now
abandoned. Divided and this application Mar. 5, 1971,
Ser. No. 121,539
Int. Cl. B44d 1/08
U.S. Cl. 117—105.2
3 Claims

ABSTRACT OF THE DISCLOSURE

A plurality of torch flames each resulting from the combustion of gaseous silicon tetrachloride and a mixture of hydrogen and oxygen are directed upon a graphite mandrel in order to form a high purity silica article upon the mandrel. Structure may be provided to prevent the buildup of deposits upon the nozzles of the torches to prevent obstruction of the nozzle openings. Additional glazing torches may be utilized to treat the silica articles as they are formed upon the mandrel.

---

This is a division of application Ser. No. 744,152, filed July 11, 1968, now abandoned.

This invention relates to the production of an article of metal oxide by the decomposition of volatile metal chlorides, and more particularly to the deposition of metal oxide upon a substrate by the vapor phase hydrolysis of volatile anhydrous chlorides of metallic elements from Groups III and IV of the Periodic System, as for example, titanium tetrachloride, aluminum trichloride, silicon tetrachloride and tin tetrachloride.

In the fabrication of certain semiconductor devices, single crystal silicon is "pulled" from a melt of very pure silicon. In order to reduce the amount of impurities introduced into the melt of silicon from the crucible containing the melt, it has been found advantageous to construct the crucible from very pure fused silica. Such silica crucibles are required to have a very symmetrical configuration and uniform side walls in order to provide a uniform "pull" from the silicon melt.

Various techniques have been heretofore developed for making articles from silica. For instance, U.S. Pat. 2,272,342, issued Feb. 10, 1942, discloses a technique for producing a transparent article of silica by vaporizing silicon tetrachloride and decomposing the vapor in a flame. By impinging the flame upon a refractory core, a layer of silica is deposited. The silica is then sintered to a transparent article by the application of heat. Further, U.S. Pat. 3,117,838, issued Jan. 14, 1964, discloses the formation of a silica crucible by oxidizing a gas mixture including silane and a reactive gas in a flaming torch to form a molten silica and then directing the molten silica onto a carbon form. Such previously developed techniques have not, however, been completely satisfactory with respect to forming an extremely pure silica crucible having the desired uniform and symmetrical configuration, in addition to providing an efficient and economic deposition of silica.

In accordance with the present invention, a plurality of torches are spaced about a surface upon which is desired to deposit the oxide of a volatile metal chloride. Each of the torches directs gaseous streams of volatile metal chloride and combustible reactants toward the surface. When the gaseous streams are ignited, the volatile metal chloride is decomposed by vapor phase hydrolysis and deposited upon the surface. Interaction between portions of the flames near the surface creates improved deposition efficiency to provide a uniform application of high purity metal oxide thereupon.

For a more complete understanding of the present invention and for further objects and advantages thereof, reference is now made to the following description taken in conjunction with the accompanying drawings, in which:

FIG. 3 illustrates a partially sectioned view of a suitable torch for use in the system shown in FIG. 1;

FIG. 4 is an end view of the torch shown in FIG. 3;

While the invention will be disclosed specifically with respect to the deposition of silicon dioxide by the decomposition of silicon tetrachloride, it should be understood that other volatile anhydrous chlorides of metallic elements from Groups III and IV of the Periodic System could also be advantageously decomposed with the present technique. In the preferred embodiment of the invention, however, silicon tetrachloride is decomposed to form silicon dioxide according to the following equation:

$$SiCl_4 + 2H_2O \rightarrow SiO_2 + 4HCl$$

Figure 1:
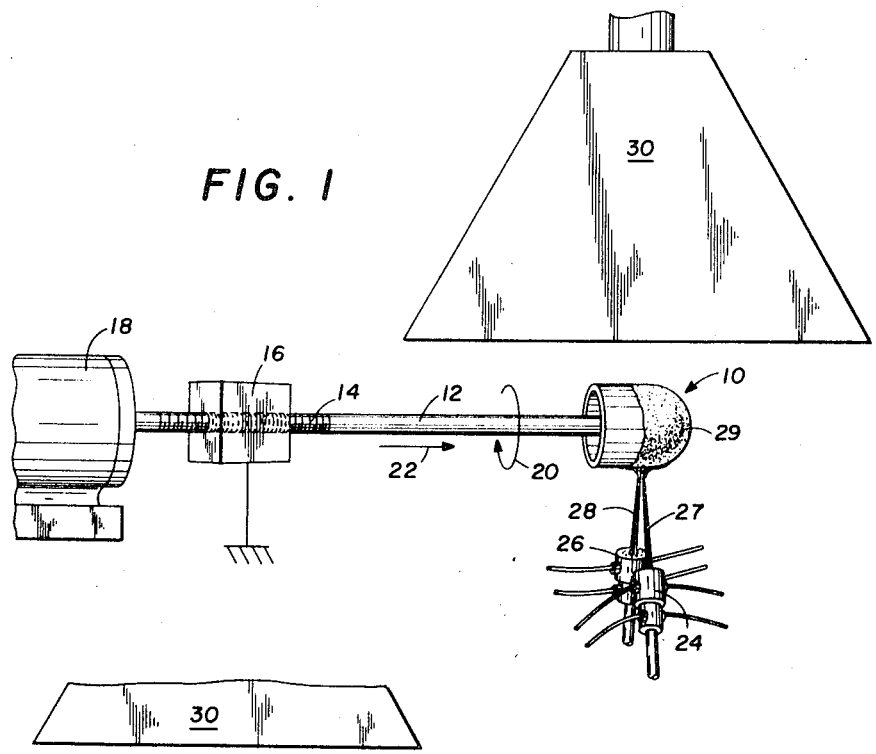
FIG. 1 illustrates a somewhat diagrammatic illustration of the present system for depositing the metal oxide article upon a rotating mandrel.

Referring to FIG. 1, a system for forming a silica crucible is illustrated. A graphic mandrel 10 has a generally cylindrical shape with a rounded end portion. Mandrel 10 is preferably constructed from material such as graphite which has a relatively higher coefficient of thermal expansion than does the silicon dioxide to be deposited thereon. Mandrel 10 is mounted upon a shaft 12 which includes a threaded portion 14. The threaded portion 14 of the shaft 12 is threadedly received in a collar member 16 which is rigidly connected to a suitable support structure. The end of shaft 12 is connected to the output shaft of a suitable motor 18. Upon energization of the motor 18, the shaft 12 will be rotated in the direction shown by arrow 20. Additionally, rotation of the shaft 12 will cause a lateral extension in the direction of the arrow 22 due to the action of the threaded portion 14 of the shaft within the stationary collar member 16. A suitable extension member is provided between the end of the shaft 12 and the output of the motor 18 to allow such lateral translation.

A pair of torches 24 and 26 are disposed adjacent the mandrel 10 to provide flames 27 and 28 directed toward the rotating mandrel 10. As will be described in greater detail, flames 27 and 28 result from the combustion of a gaseous volatile metal chloride and a mixture of combustible gases. The volatile metal chloride is decomposed due to vapor phase hydrolysis by the flames and results in the deposit of high purity silicon dioxide designated generally by numeral 29 upon the exterior surface of the rotating mandrel 10.

Figure 2:
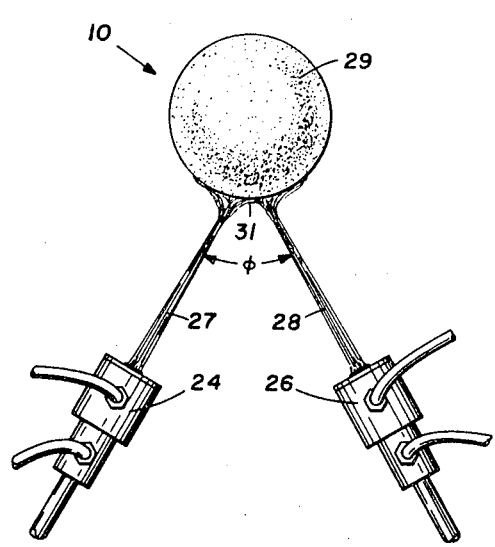
FIG. 2 shows a somewhat diagrammatic end view illustration of the system shown in FIG. 1.

A vent hood 30 is disposed above the mandrel 10 opposite the torches 24 and 26 in order to draw off fumes and undesired components resulting from the flame reaction. FIG. 2 illustrates an end view of the system shown in FIG. 1 wherein the torches 24 and 26 are spaced apart at an angle $\phi$. It has been found that a range of angles between 60° and 120° produces excellent results, with an angle $\phi$ of 90° being preferred for many configurations of the system. It is usually desirable to provide an angle $\phi$ wherein there is a small region 31 of interaction between portions of the flames near the surface of the mandrel 10. It has been found that improved deposition efficiencies are provided when such an area of flame interaction is provided.

FIGS. 3 and 4 illustrate an embodiment of a torch which may be used to perform the present invention. For further descriptions on the construction and use of a similar torch, reference is made to the copending U.S. patent application Ser. No. 744,188 by Michael A. Carrell, filed July 11, 1968, now U.S. Pat. No. 3,565,346. It will be understood that various other types of suitable torches for decomposing a volatile metal chloride could also be used to perform the present invention.

Referring to FIGS. 3 and 4, a stainless steel tube 32 extends through the length of the torch to provide a passage for vaporized silicon tetrachloride which may be entrained in a carrier gas. A T-connection 33 is connected about the tube 32 and is sealed to the tube 32 by member 34. A member 36 fits over a stainless steel tube 38 to provide a seal between the end of tube 38 and the tube 32. A narrow annular sheath chamber 40 is thus defined between the tube 32 and tube 38. An inlet portion 42 of the T-connection 33 is connected to a source of sheath gas, in this instance oxygen, so that the sheath gas is passed into the sheath chamber 40. One actual embodiment of the invention, utilized a one-fourth inch diameter stainless steel tube 32 and a three-eighths inch diameter stainless steel tube 38.

An annular housing 44 defines an annular mixing chamber 50 about tube 38. An inlet fitting 52 is connected to a source of hydrogen while an inlet fitting 54 is connected to a source of oxygen. An annular housing portion 56 defines an annular cooling chamber about the housing 44. An inlet fitting 58 is connected to a source of cooling fluid, such as cool water, and an outlet fitting 60 allows exhausting of the cooling fluid.

A nozzle 62 is fitted over the end of the torch. As shown in FIGS. 3 and 4, the nozzle 62 comprises a circular member with bent flanges 64 for fluid tight connection to the torch. A central nozzle aperture 66 is provided in the end of tube 32. The end of the tube 32 is received by the nozzle 62 to define an annular sheath opening 68 concentrically disposed relative to the aperture 66. Sheath opening 68 communicates with the sheath chamber 40. Nozzle aperture 66 has a substantially smaller area than the interior area of the tube 32, such that a relatively high velocity jet of gas is provided from the nozzle aperture 66. Gas flowing from the sheath opening 68 substantially envelopes the jet of gas from the nozzle aperture 66 to prevent immediate reaction thereof, thereby reducing deposition of material on the face of the nozzle member 62 and preventing obstruction thereof.

A plurality of apertures 70 are symmetrically disposed around the nozzle aperture 66 in a cylindrical configuration and communicate with the mixing chamber 50. Combustible gas contained in the mixing chamber 50 flows out of the apertures 70 and reacts with the gas flowing from the aperture 66. In a preferred embodiment of the torch, eight apertures 70 were provided. In this practical embodiment of the torch, diameters of .063 inch were found advantageous for aperture 66 and .052 inch for apertures 70. For different operating conditions, greater or larger numbers of apertures 70 may be used.

Oxygen is supplied via a conduit 72 to the inlet of three flowmeters 74, 76 and 78. A suitable source supplies hydrogen through a conduit 80 to a flowmeter 82. The oxygen and hydrogen are dried prior to entering the flowmeters. Suitable valves are provided on the output of each of the flowmeters in order to allow regulation of the rate of flow of the hydrogen and oxygen to the system. Oxygen is fed from flowmeter 76 via a conduit 84 to a bubbler system designated generally by the numeral 86. Bubbler system 86 comprises a container filled with liquid silicon tetrachloride. A diffusing element 88 bubbles the oxygen upwardly through the silicon tetrachloride, thereby entraining vapors of the silicon tetrachloride in the oxygen, and passing outwardly through the conduit 90.

Conduit 90 is connected to the tube 32 to provide a metered stream of vaporized silicon tetrachloride entrained in the oxygen carrier gas. Oxygen is also supplied through the flowmeter 74 via a conduit 92 to the inlet fitting 42 of the T-connection member 33. Oxygen thus flows into the sheath chamber 40 and out the annular aperture 68 in the manner previously described. Oxygen is further supplied via a conduit 94 to the inlet fitting 54 for passage into the mixing chamber 50. Hydrogen is supplied through the flowmeter 82 via a conduit 96 into the inlet fitting 52 for mixing with the oxygen inside the mixing chamber 50. A mixture of combustible gas is then fed outwardly through the apertures 70 in the manner described. Because the hydrogen and oxygen are mixed within the small chamber 50 within the torch, flashback in the present torch is limited to the interior of the torch itself.

In operation of the torch shown in FIGS. 3 and 4, the gaseous streams issuing from the apertures 66, 68, and 70 are ignited to form a hot flame which has temperatures in the range of about 1500° C. The oxygen flowing from the annular opening 68 is relatively inert with respect to the gaseous silicon tetrachloride issuing from the aperture 66, and therefore the silicon tetrachloride is not decomposed immediately adjacent the face of the nozzle 62. This prevents accumulations of obstructions in the apertures of the torch. The gaseous silica tetrachloride does intermix with the mixture of oxygen and hydrogen issuing from the apertures 70 at a further distance from the nozzle, and combustion occurs in this region.

Figure 5:
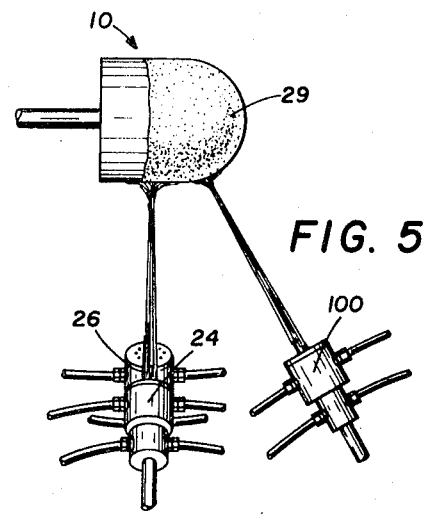
FIG. 5 is a somewhat diagrammatic illustration of another embodiment of the invention.

It has been found that the use of at least two torches in the manner shown in FIG. 1 provides a high purity silica article having sufficient "green strength" to enable the article to be lifted off the mandrel and deposited in the furnace for additional heat treating thereof. However, in some instances it has been found desirable to utilize a glazing torch to further increase the strength of the silica article before it is removed from the mandrel. FIG. 5 illustrates a system similar to that shown in FIG. 1 with the exception that a glazing torch 100 has been added. Torches 24 and 26 operate in the same manner as that previously dissolved to helically deposit a layer of high purity silica 29 as the mandrel 10 translates past the flames 27 and 28.

A silica article is deposited on the mandrel depending upon the rotational and translational speed of the mandrel. Wall thickness of the article may vary from a few mils up to several inches thick. The glazing torch 100 helically heats portions of the silicon dioxide body 29 as it translates past in order to slightly sinter the body to provide it with sufficient "green strength" to allow easier removal from the mandrel. This sintering also assists in maintaining the symmetrical configuration of the side walls of the silica article 29.

Figure 6:
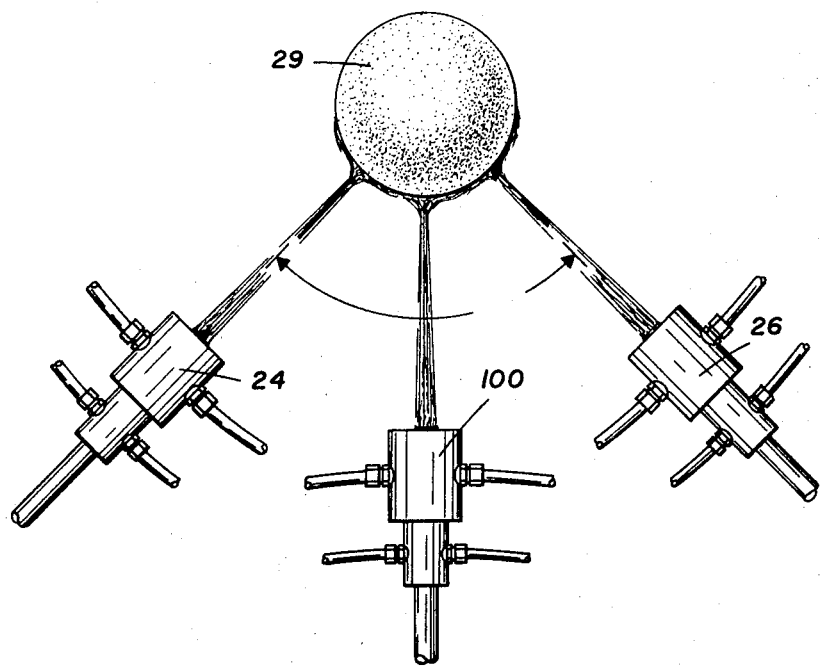
FIG. 6 is an end view of the embodiment shown in FIG. 5.

FIG. 5 illustrates that the glazing torch 100 is spaced away from the torches 24 and 26 near the curved end of the mandrel 10. The torch 100 is also disposed between the torches 24 and 26 as shown in FIG. 6.

Figure 7:
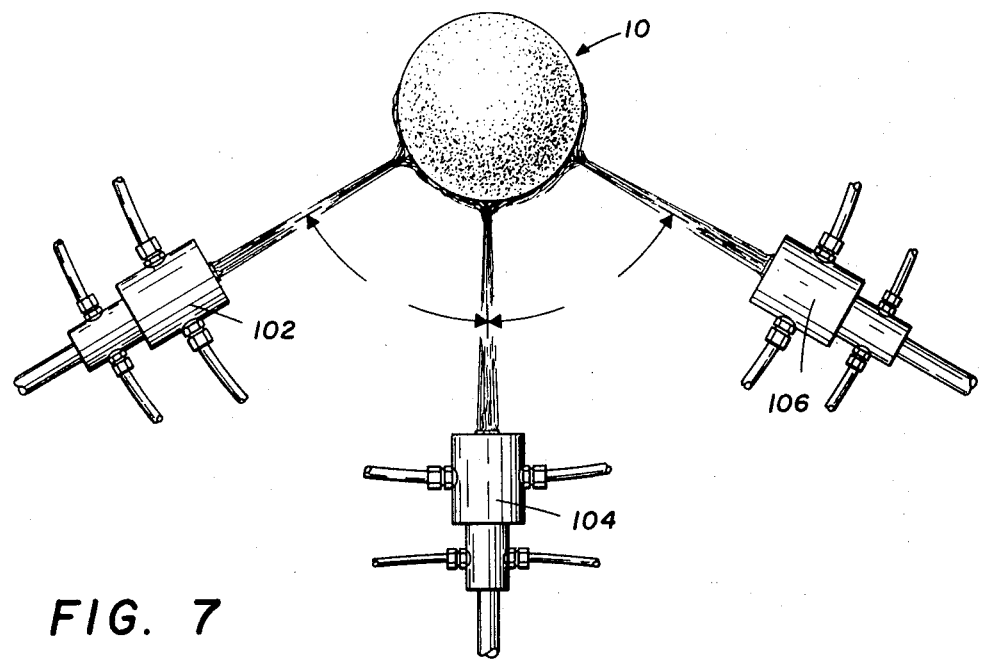
FIG. 7 is a somewhat diagrammatic end view of another embodiment of the present invention.

In some instances, it is desirable to utilize more than two torches. FIG. 7 illustrates use of three torches 102, 104 and 106 directed toward the rotating mandrel 10. Although the angles between the torches may be varied according to desired operating conditions, it is generally desired to space the torches close enough so that the flames of the adjacent torches interact near the surface of the mandrel as shown by flame regions 108 and 110. This interaction has been found to produce superior results and increased deposition efficiency.

The following examples will serve to further illustrate the use of multiple torches, but should not be considered as limiting with respect to the true scope of the invention.

EXAMPLE 1

A graphite mandrel approximately five inches in diameter and six inches long was rotated and translated by a system similar to that shown in FIG. 1. The graphite mandrel was rotated at 24 r.p.m., and was translated at about one inch per minute past two torches each constructed similarly to the torch shown in FIGS. 3 and 4. The mandrel was slightly preheated before the deposition process began. In this instance, the graphite mandrel was coated with a smooth coating of silicon carbide. The torches were angled with respect to each other at approximately 90° and were each spaced from the rotating mandrel at about three and one-half inches. About 0.6 liter per minute of oxygen was fed into a bubbler maintained at about 54° C. to provide vaporized silicon tetrachloride in the stream of oxygen. The output of the bubbler was fed directly into the central pipe of one torch, with a separate bubbler provided for the second torch. One liter per minute of oxygen was provided to each torch for use as a sheath gas in the manner described. 5.2 liters per minute of oxygen and thirty liters per minute of hydrogen were provided to each torch for mixture therein and use as the combustible gas. Upon ignition of both torches, the resulting flames were impinged upon the rotating and translating mandrel for one hour. After deposition and cooling, it was found that 257 grams of high purity silica had been deposited upon the mandrel to form a uniform and symmetrical silica crucible. Upon cooling, the crucible was separated from the mandrel and subjected to further treatment. This rate of deposition of 257 grams per hour was found to be substantially more than twice the rate of deposition with a similar system utilizing only a single torch. As previously described, this is believed to be because of interaction between the flames of the two torches.

EXAMPLE 2

A similar deposition system to that described in Example 1 was utilized, with the same flow rate parameters, except that the deposition torches were spaced about four inches from the mandrel and a single glazing torch was disposed about five and one-half inches from the front of the mandrel in the manner shown in FIG. 5 at a 45° angle to the horizontal. Deposition was continued for one hour and thirty minutes, after which 495 grams of high purity silica had been deposited upon the mandrel. This provided a deposition rate of 330 grams per hour, substantially more than with the expected rate based upon the results from deposition with a single torch. The resulting silica crucible had an excellent symmetrical shape with no cracks in the side walls thereof.

Whereas the present invention has been described with respect to several embodiments thereof, it may be understood that various changes and modifications will be suggested to one skilled in the art, and it is desired to encompass such changes and modifications that fall within the true scope of the invention as defined by the appended claims.

What is claimed is:
1. The method of directly depositing the oxide of a metallic element upon a mandrel to form an article of preselected shape comprising:
 (a) forming a plurality of streams of the vapor of a volatile compound of said metallic element,
 (b) forming a stream of combustible gas about each said stream,
 (c) igniting said streams at zones of interaction to form a plurality of flames which cause vapor phase hydrolysis of said metallic element, and
 (d) directing said flames to provide a region of interaction near the mandrel between portions of at least two of said flames to form an article of high purity oxide.
2. The method of claim 1 and further comprising: streaming a supply of relatively inert gas between each said jet stream and each said stream of combustible gas to prevent interaction between said streams in a preselected region.
3. The method of claim 1 wherein said flames are directed toward said mandrel at angles to one another.

References Cited
UNITED STATES PATENTS

| | | | |
|---|---|---|---|
| 3,275,408 | 9/1966 | Winterburn | 23—182 |
| 3,041,194 | 6/1962 | Rosen et al. | 117—38 |
| 3,378,396 | 4/1968 | Zaromb | 117—105.5 X |
| 3,114,826 | 12/1963 | Sullivan et al. | 214—76 |
| 3,617,216 | 11/1971 | Arkless et al. | 23—182 |

EDWARD G. WHITBY, Primary Examiner

U.S. Cl. X.R.

23—182 R; 117—105.3, 105.5; 264—81, 332